Dec. 11, 1962 H. B. KAST 3,067,580
FUEL ENRICHMENT CONTROL FOR A GAS TURBINE ENGINE
Filed Sept. 26, 1960 4 Sheets-Sheet 1
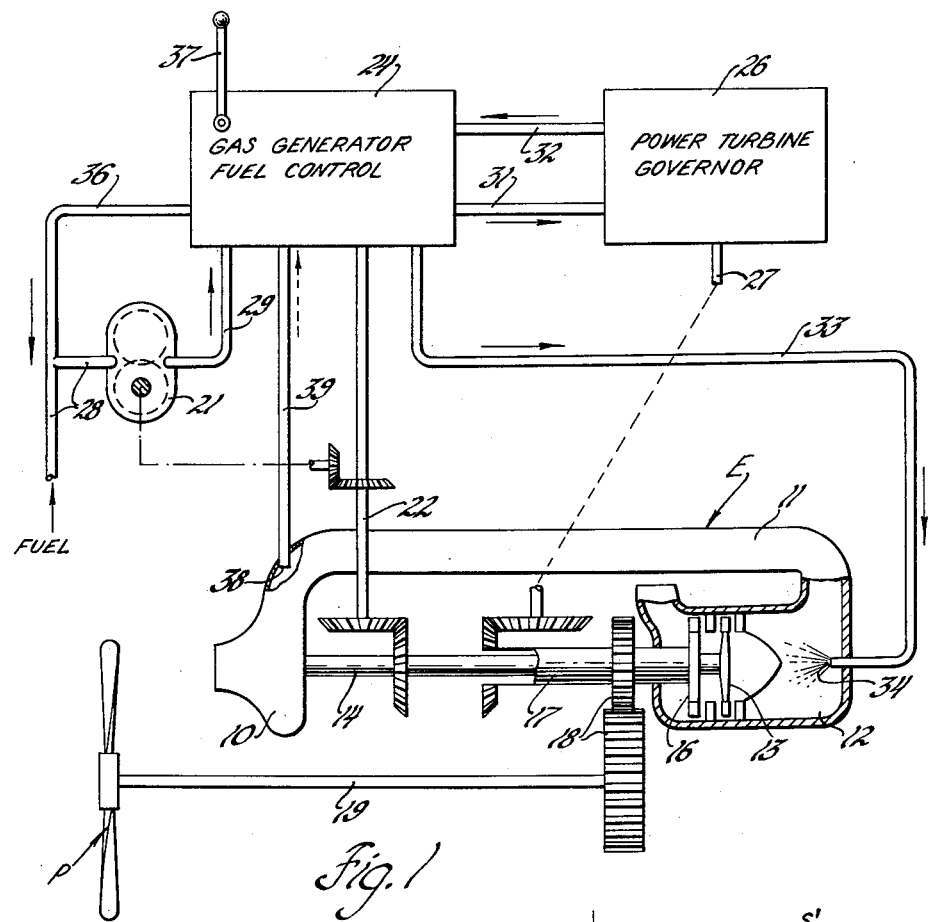
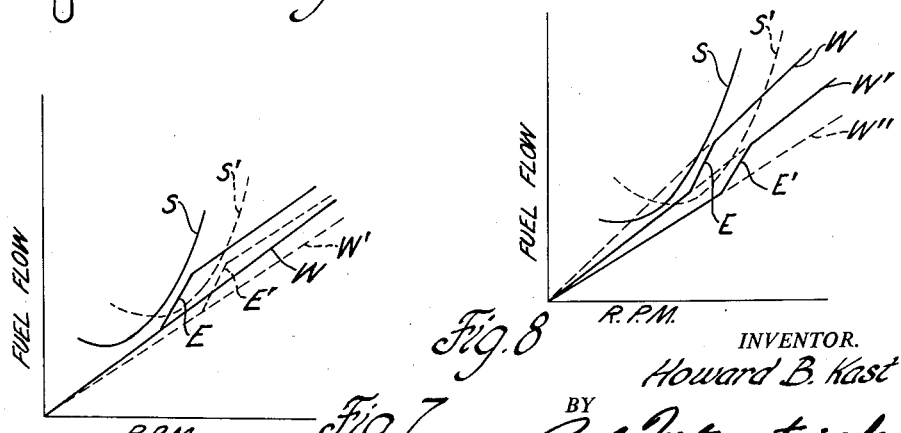
INVENTOR.
Howard B. Kast
BY
Paul Fitzpatrick
ATTORNEY INVENTOR.
Howard B. Kast
BY Paul Fitzpatrick
ATTORNEY Dec. 11, 1962 H. B. KAST 3,067,580
FUEL ENRICHMENT CONTROL FOR A GAS TURBINE ENGINE
Filed Sept. 26, 1960 4 Sheets-Sheet 3
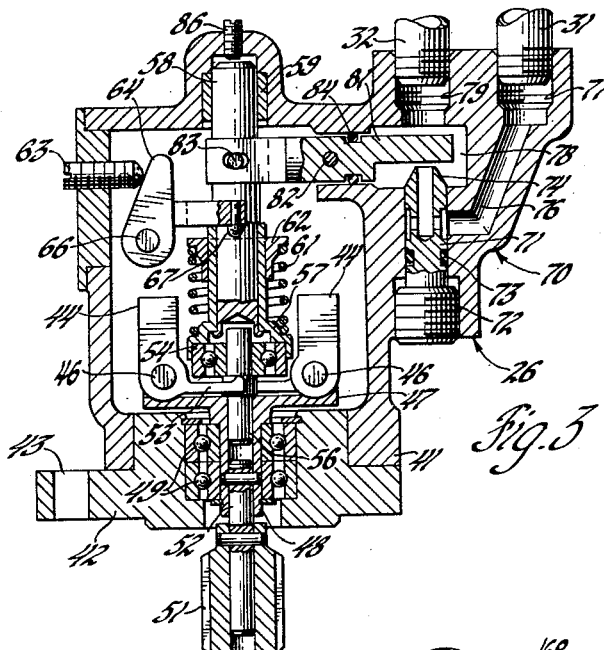
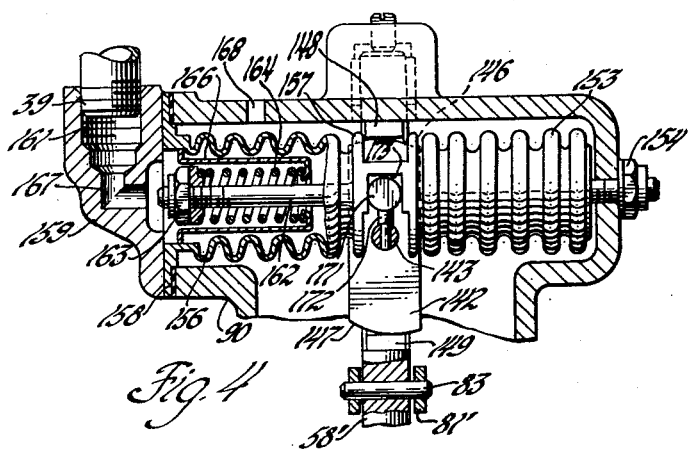
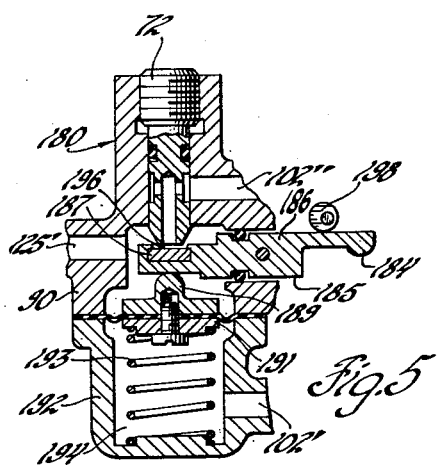
INVENTOR.
Howard B. Kast
BY
Paul Fitzpatrick
ATTORNEY _United States Patent Office_ 3,067,580
Patented Dec. 11, 1962

3,067,580
FUEL ENRICHMENT CONTROL FOR A GAS TURBINE ENGINE
Howard B. Kast, Milwaukee, Wis., assignor to General Motors Corporation, Detroit, Mich., a corporation of Delaware
Filed Sept. 26, 1960, Ser. No. 58,452
5 Claims. (Cl. 60—39.28)

Introduction

My invention relates to controls for gas turbine engines. It is particularly directed to the provision of control mechanism best suited to the requirements of small propulsion or auxiliary engines for aircraft, but it is applicable to other engines. The provision of suitable controls for a small engine, such as one in the 100 to 500 shaft horsepower range, presents serious and intriguing problems. Simply to duplicate the very involved and expensive control systems used on 4,000 horsepower aircraft gas turbines is not at all feasible, since the result would be a power plant in which the cost, volume, and weight of the controls exceed those of the engine. However, a small engine should be controlled in much the same way as a large one. The situation, therefore, stimulates a quest for control equipment which, while adequate, is as simple as possible and particularly is compact and light.

My invention is disclosed herein as embodied in mechanism for controlling the fuel to an aircraft gas turbine of the free turbine type; that is, one in which a power output shaft is driven by a turbine rotating independently of the compressor of the engine, which is driven by another turbine. The invention is particularly concerned with the incorporation in a gas turbine control of means for varying the fuel schedules or fuel limits of the engine to make them accord better with engine characteristics as these characteristics change with variations in ambient temperature. Put another way, the invention is concerned with the provision of simple and adequately precise mechanism to facilitate skirting the compressor surge region and providing the maximum allowable fuel for acceleration of the engine under varying ambient conditions.

The nature of the invention and the advantages thereof will be clearly apparent to those skilled in the art from the succeeding detailed description of two preferred embodiments of the invention and the accompanying drawings thereof.

FIGURE 1 is a schematic diagram of a gas turbine power plant.

FIGURE 3 is a schematic sectional view of a power turbine governor.

FIGURE 4 is a sectional view illustrating the compressor discharge pressure responsive means of the gas generator fuel control.

FIGURE 5 is a sectional view of a portion of the fuel schedule enrichment mechanism of the gas generator fuel control.

FIGURE 7 is a chart explanatory of the operation of the device of FIGURES 2, 4, and 5.

FIGURE 8 is a chart explanatory of the operation of the device of FIGURE 6.

Figure 2:
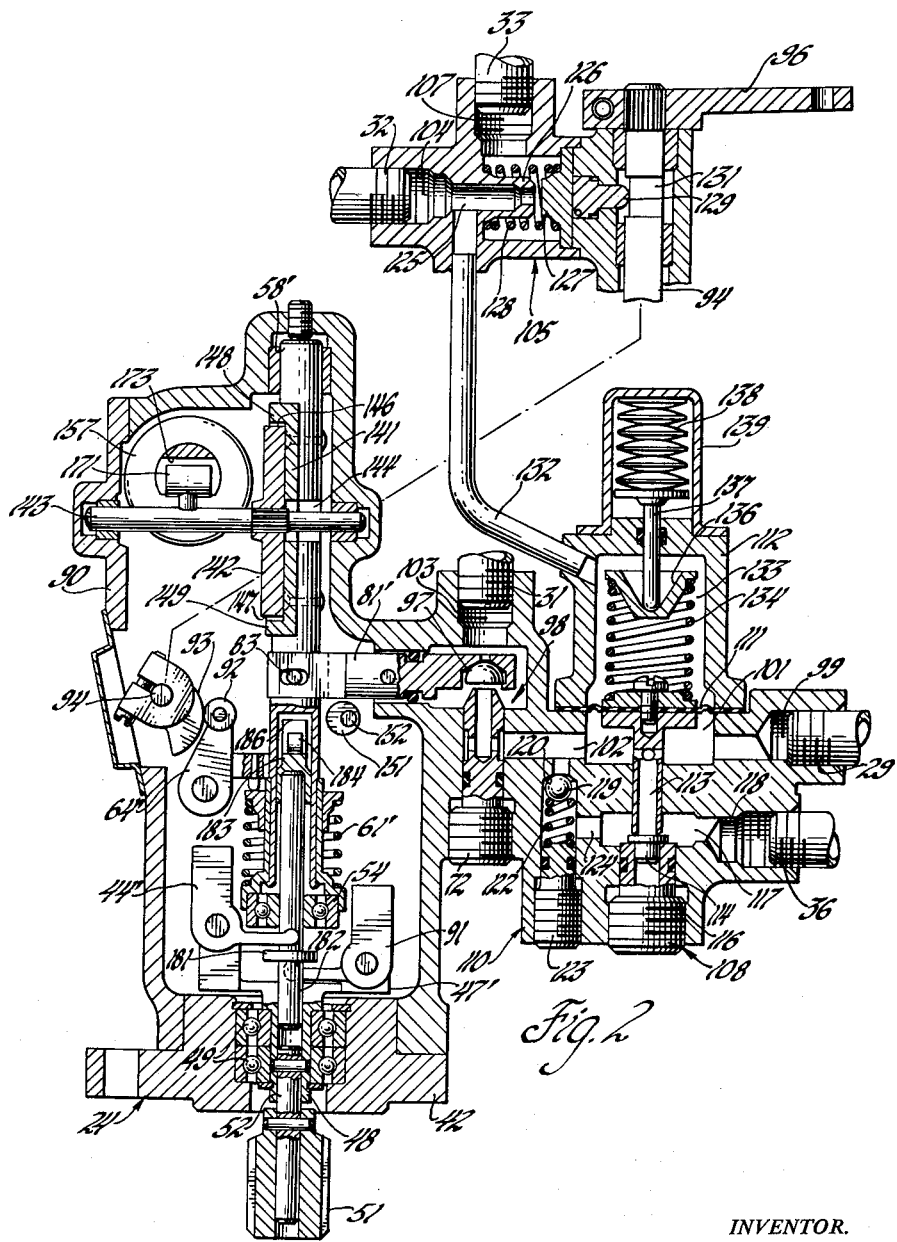
FIGURE 2 is a schematic sectional view of a gas generator fuel control.

The power plant illustrated schematically in FIGURE 1 comprises a gas turbine engine E geared to and driving a propeller P, which may be a variable pitch aircraft propeller with or without speed governing and blade angle (beta) control. The engine comprises a compressor 10 shown as centrifugal, which delivers through a duct 11 to a single combustion chamber 12 from which combustion products are discharged through a gas generator turbine including a wheel 13 coupled by a shaft 14 to the compressor. The motive fluid passes also through a low pressure turbine including a wheel 16, which may be called a free turbine, and which provides the power output of the engine. The turbine wheel 16 is coupled through a hollow shaft 17 concentric with shaft 14 and main reduction gearing shown schematically by the gears 18 to the power output shaft 19 which drives the propeller P (or other power consuming device). The aggregate of compressor 10, combustion chamber 12, and turbine 13 is termed a gas generator because it generates gas under pressure which drives the power output or free turbine 16. Or, if turbine 16 is omitted, the engine E contains the elements of a simple turbojet engine.

Certain engine accessories, including the engine fuel pump 21, are driven by an accessory drive shaft 22 geared to the gas generator shaft 14. Shaft 22 also provides a speed input to a gas generator fuel control 24 which may be as illustrated in FIGURES 2, 4, and 5, to be described. The engine controls also include a power turbine governor 26 which structurally is an independent structure from the gas generator control and preferably is of the type illustrated in FIGURE 3. The power turbine governor is driven from the power turbine shaft through a power take-off shaft 27.

In the controls to be described, the gas generator fuel control and power turbine governor incorporate series fuel throttling or metering valves which may independently limit the fuel supply to the engine to prevent overspeed by either turbine, to cause the turbines to operate at a desired speed, and to limit fuel flow appropriately during acceleration and deceleration of the engine.

To this end, fuel supplied from a suitable source, such as an aircraft boost pump, is conducted through a fuel supply line 28, pump 21, and a pump discharge line 29 to the gas generator fuel control. Fuel then flows through a line 31 to the power turbine governor and returns through a line 32 to the gas generator fuel control, from which it flows through a fuel outlet line 33 to the fuel nozzle 34 of the engine. The gas generator fuel control includes a metering head regulating valve which bypasses excess fuel back to the pump inlet through a return line 36. Suitable means for controlling the operation of the engine may include a power control lever 37 by which a power or speed setting is imparted to the control. The fuel control responds also to a phenomenon indicative of compressor operation or air flow, specifically to compressor discharge pressure (hereafter called CDP), which is sensed by a total pressure probe 38 in the compressor outlet coupled by a pressure connection 39 to the control 24.

Power Turbine Governor

We may now proceed to a description of the preferred structure of the fuel control mechanism. Since the fuel control 24 (FIGURES 2, 4, and 5) is much more complex than the governor 26 of FIGURE 3 and there is much common structure in the two devices, it appears preferable to describe first the governor 26. The power turbine governor is simply an elementary governor in which a fuel throttling valve is moved in the closing direction by a speed responsive flyweight device. While in some installations a variable speed setting power turbine governor might be incorporated, the governor 26 has a fixed adjustable speed setting rather than a variable setting. The governor includes a case or housing 41, one end of which is closed by a shaft housing and mounting plate 42 having drilled ears 43 by which it may be mounted on a suitable pad. A set of flyweights 44, which may be two in number, are mounted by shafts 46 on a disk 47 integral with a shaft 48 supported by ball bearings 49 in the mounting plate 42. Shaft 48 is suitably coupled to the power turbine driven shaft 27 illustrated in FIGURE 1 as by an externally splined coupling member 51 and an intermediate shaft 52 piloted into the coupling member and the shaft 48.

The flyweights 44 include force arms 53 which bear against the inner race of a ball thrust bearing 54 which is aligned with the shaft 48 by a stub shaft 56 piloted within the shaft 48 and the thrust bearing and slidable in one or the other. The outer race of the bearing 54 is contained in the flanged end of a sleeve 57 fixed to a nonrotating governor stem 58. The upper end of stem 58 is guided in a bushing 59 mounted in a recess in the body 41. The force to oppose the flyweights 44 is derived from a speeder spring 61 compressed between the upper surface of the flange of sleeve 57 and an abutment 62 slidable over the upper portion of the sleeve and guided thereby. The loading of spring 61 and thereby the speed setting of the governor is adjusted by a screw 63 threaded into the case which bears against a bellcrank lever assembly 64 pivoted on a shaft 66 and having a clevised end 67 bearing against the spring retainer 62.

The reciprocation of the stem 58 varies the opening of a throttling governor valve 70. This valve comprises an axially adjustable seat member 71, including a head 72 threaded into the body 41 and provided with an O-ring seal 73. Radial ports in the seat member 71 connect an annular seat 74 with a passage 76 in the body 41 communicating with a threaded port 77 to which the fuel inlet line 31 of the governor is connected. Seat 74 is disposed in a chamber 78 in communication with fuel outlet port 79 to which line 32 is connected. The governor valve comprises a rocker arm 81 having a pivot at 82 and coupled to the stem 58 by a pin 83 passing through the stem and received in elongated slots in the clevised end of arm 81. An O-ring seal 84 disposed around the rocker arm 81 and bearing against the walls of the case seal off the chamber 78 from the flyweight chamber within the case. The end of rocker arm 81 is moved toward and away from the seat 74 by reciprocation of the stem 58. A stop screw 86 is provided to limit the closing movement of the valve 70. The valve should have a minimum opening sufficient to pass enough fuel to prevent flameout of the engine, which otherwise might occur from a transient of governor response to power turbine overspeed. Apart from the limitation of the closing movement, the valve 70 normally is open as long as the power turbine is below the speed set by screw 63, and closes rapidly as the power turbine speed exceeds the setting of its governor. Obviously, the governor can be made variable speed by providing readily operable means to move bellcrank 64.

Gas Generator Fuel Control

The gas generator fuel control 24 (FIGURE 2) includes a main fuel metering valve which is structurally very similar to the governor valve 70 and a speed responsive mechanism which is in many respects structurally similar to that of the governor 26. The speed responsive mechanism differs, however, in that there is a second set of flyweights which provide a speed sense to the enrichment mechanism which will be described. The gas generator governor also includes a metering head regulating valve, a relief valve, a shut-off valve, speed setting means, and means responsive to compressor discharge pressure.

So far as the structures of the fuel control correspond to those previously described with reference to the governor 26, they are given the same or corresponding primed reference numerals.

The fuel control 24 includes a mounting plate 42 which may be identical to that previously described, and supports a governor shaft 48 by identical bearing arrangements. The speed input shaft 52 is connected by the splined coupling member 51 to the gas generator driven shaft 22 (FIGURE 1). The speed responsive mechanism is housed in a case 90 suitably fixed to the mounting plate 42. The flyweights 44' act against a governor stem 58' corresponding to the stem 58, but of different structure, which is loaded by a speeder spring 61', the speed setting of which is adjusted by a bellcrank lever 64'. The speed setting of the speed responsive device is variable. The lever 64' mounts a cam follower roller 92 and is adjusted by a cam 93 fixed to a shaft 94 which, as shown in the partially broken away view at the upper part of the figure, is connected to an arm 96 which may correspond to or be coupled to the power control lever 37 illustrated in FIGURE 1. The flyweights 44' bias the stem 58 through a thrust bearing 54 and the stem is coupled to a movable variable member or rocker arm 81' which may be identical to member 81. Rocker arm 81' is a part of main fuel metering valve 98 which may be identical in structure to governor valve 70 and is connected in series with it. Arm 81' may include a half-ball seat 97. The line 29 from the fuel pump enters the body at a threaded port 99 which is connected by way of a chamber 101 and passage 102 to the valve 98, which deliver fuel to port 103 from which line 31 connects to the governor 26. The line 32 returning from the governor 26 enters the control at a port 104. The fuel passes through a manually operated fuel shut-off valve 105 to a port 107 to which the fuel delivery line 33 is connected.

We may now describe briefly the various valves and other parts of the fluid circuit shown in FIGURE 2. These elements include a metering head regulating valve indicated generally at 108 and a relief valve 110. The fuel at pump discharge pressure entering through line 29 and passing through chamber 101 exerts an upward force on the controlling diaphragm assembly 111 of the head regulating valve 108. This diaphragm is held between the housing 90 and a cylinder 112. Diaphragm 111 is fixed to a hollow valve member 113 having lateral ports communicating with chamber 101 and cooperating at its lower end with a fixed valve member 114 mounted in a plug 116 adjustably screwed into the case. Fixed valve member 114 is mounted in a chamber 117 communicating with outlet 118 from which the fuel return or bypass line 36 runs to the pump inlet. When valve member 113 moves upward, an annular orifice is opened between it and the fixed member 114 to bypass or return fuel to the pump inlet.

The emergency relief valve 110 comprises a ball 119 engaging a seat 120 under the urging of a compression spring 122 adjustably retained by threaded plug 123. This valve is provided for emergency relief only and should be expected to operate only when the flow to the engine is shut off. The relief valve communicates through a passage 124 with the return port 118.

The circuit by which the fuel flows through the valves 98 and 70 in series and to port 104 have been described. Port 104 communicates through passage 125 with the hollow annular seat member 126 of shutoff valve 105, which cooperates with a flexible elastomeric valve closing member 127. Member 127 is biased away from seat 126 by compression spring 128 and is operated to close the valve by a slidable plug 129 bearing against the rear surface of the valve member 127. Plug 129 cooperates with a cam surface 131 cut in the power control shaft 94. The cam surface is so configured that when the arm 96 is turned to the engine shutdown or fuel-off position, plug 129 presses member 127 against the seat 126, thereby shutting off all flow of fuel to the engine.

The fuel entering through port 104 is at metered fuel pressure, that is, the pressure of the fuel after passing through the valves which determine the amount of fuel supplied to the engine. This pressure provides a second controlling force for the regulating valve 108. A passage indicated on the schematic by conduit 132 connects the passage 125 to the chamber 133 within the cylinder 112 above the diaphragm 111. This pressure, therefore, biases bypass valve 108 to close. It is also biased to close by a compression spring 134 bearing against the diaphragm assembly 111 and against a movable retainer 136. Retainer 136 is automatically moved in accordance with ambient air temperature by temperature responsive means which preferably may be, as illustrated, a stack 138 of coned bimetal rings. The rings are retained in a cup-shaped housing 139 fixed to the cylinder 112. They bear against the end of this housing and against the plunger 137 passing through the end of cylinder 112 and bearing against the spring retainer 136. Cup 139 may be located at any point subject to ambient air temperatures. Variations in temperature change the cone angle of the bimetal elements and thereby move the stem 137 to change the loading of spring 134. This in turn varies the metering head, which is determined by the force of spring 134. The effect of ambient temperature compensation is to increase the metering head as temperature rises.

To review briefly the effect of the mechanism so far described, the fuel flow to the engine, assuming the shut-off valve is open, will be determined by the opening of the valves 98 and 70 and by the head across the two valves which is modulated by ambient temperature. The opening of valve 70 is a function of power turbine speed only. That of valve 98 is a function of turbine speed and of the speed setting entered by movement of shaft 94.

The gas generator fuel control also includes means setting maximum and minimum limits for the speed control valve 98 in response to compressor discharge pressure, which is a suitable parameter of compressor or gas generator operation for this purpose. As is well known, the gas generator fuel must be limited to prevent overheating and compressor surge during acceleration and must be limited to keep it from dropping so low that flameout occurs when the engine is decelerated. While the speed responsive valve 98 is adapted to meter fuel to the engine for normal steady-state running, it is inadequate alone to handle the transients resulting from a substantial change in the speed setting by the control 37. In the event of such a substantial change, the governor might shut off fuel entirely or open the fuel valve 98 so far as to over-fuel the engine and cause rapid overheating or compressor surge. The inclusion of means responsive to compressor discharge pressure is a convenient, simple, and desirable way of providing for this situation.

As previously stated, the governor operated stem 58' corresponds to the stem 58 of the power turbine governor and its reciprocations in response to the speed of the engine and the loading of spring 61' vary the opening of the main fuel metering valve 98. The movable member 81' of the valve is coupled by a pin 83 to stem 58'. A cam follower plate 141 is riveted against a flat milled on stem 58'. This plate cooperates with a rotatable cam 142 (see also FIGURE 4) splined to a camshaft 143 mounted in bushings in the case. This shaft passes through a slot 144 in the stem 58' and cam follower plate 141 of sufficient length to provide for travel of stem 58'. Cam 142 has a maximum limit cam surface 146 and a minimum limit cam surface 147. These cooperate respectively with a follower 148 projecting from the upper end of plate 141 and a follower 149 projecting from the lower end thereof. These followers, in coaction with the cam, determine limits of movement of the stem 58' and, therefore, of the valve 98. A second adjustable fixed minimum opening limit may be provided by an eccentric 151 mounted on a shaft 152 (FIGURE 2) and settable by means not illustrated.

The rotation of cam 142 is effected by the means responsive to compressor discharge pressure illustrated in FIGURE 4. This comprises an evacuated bellows 153 mounted on the case by stud and nut 154, a compressor discharge pressure bellows 156 opposing bellows 153 and a head 157 fixed to and joining the free or movable ends of the two bellows. The fixed end of bellows 156 comprises a flange 158 held between the case 90 and a fitting 159 providing a port 161 to which the CDP line 39 is connected. A stem 162 extending from the head 157 mounts an adjustable nut and retainer 163 which bears against a compression spring 164, the other end of which engages the end of a cup 166 fixed to the flange 158. The CDP enters the interior of the bellows 156 through a passage 167, and the housing is vented by a port 168. The bellows 153, which is evacuated and is of equal area to bellows 156, compensates for variations in atmospheric pressure so that the movement of head 157 is determined by CDP acting against the spring 164. Movement of the bellows is communicated to camshaft 143 by a cylindrical follower 171 mounted on a pin 172 extending radially from the shaft. This follower is engaged in a rectangular slot 173 in the head 157. The CDP mechanism is adjustable by adjustment of either of nuts 154 and 163. The contours of cam 142 will, of course, be based upon the characteristics of a particular power plant for which the control is adapted, which may be determined by experimental running of the engine.

*Fuel Enrichment (FIGURE 5)*

This brings us to the enrichment mechanism, which is the only part of the control not yet described. As indicated previously, this part of the system increases fuel above what would be supplied by the action of the speed controlled metering valve and the head regulating valve, as limited by the CDP sense, under certain conditions of operation. It responds to speed of the gas generator and to ambient air temperature. Ambient temperature is chosen as a convenient parameter representative of engine inlet temperature. Engine inlet temperature may be employed instead, if desired, with some improvement in accuracy of control. The species of the control shown in FIGURES 2, 4, and 5 enriches by opening a valve 180 in parallel with the metering valve 98. This enrichment valve is controlled by gas generator speed and by temperature which is represented by metering head.

Considering first the speed responsive mechanism, there is a second set of flyweights 91 mounted on the speed head 47'. These act against a flange 181 of a plunger 182 reciprocably guided within shaft 48 and extending through the inner race of bearing 54 to a head 183 reciprocable within the hollow speed stem 58'. Enrichment stem 182 is capable of reciprocation entirely independently of stem 58'. The movement of stem 182 is communicated to the rounded end portion 184 (see also FIGURE 5) of a lever 185 which extends through a window 186 in the stem 58'. Lever 185 is mounted and sealed similarly to levers 81 and 81' previously described and mounts a movable valve member 187 preferably of slightly yielding material which coacts with a fixed adjustable valve plug 72 structurally the same as the valve plugs 72 previously described. Lever 185 is engaged by a projection 189 on a diaphragm assembly 191 retained between the case 90 and a cylinder 192 suitably fixed thereon. A compression spring 193 within this cylinder biases lever 186 clockwise and thus acts against the flyweights 91. Unmetered fuel pressure is communicated to the chamber 194 within the cylinder 192 through a passage 102' which communicates with the passage 102 (FIGURE 2) at the pressure of fuel immediately upstream of the metering valve 98.

Chamber 102 also is connected through a fuel supply passage 102" in the body with valve 180 in which the fixed valve member 72 provides a variable orifice at 196 in coaction with lever 185. This valve may allow flow from passage 102" into a passage 125' communicating with the inlet passage 125 immediately upstream of the shut-off valve 105 and downstream of the fuel regulating valves 98 and 70. The forces acting upon arm 186, therefore, include the force exerted by flyweights 91 in response to gas generator speed and metered fuel pressure acting on diaphragm 191, which tend to rotate the lever so as to open valve 180. The forces tending to close the valve are the force of spring 193 and unmetered fuel pressure in chamber 194. It will be seen, therefore, that as the metering head increases the valve tends to close and as the metering head decreases it tends to open. The proportions of the structures and the load of spring 193 are such that the valve 196 is closed at low engine speeds. At a higher range of speeds, the increased force of flyweights 91 tends to open the valve, and this movement is resisted by spring 193. It is also resisted by the metering head which, as previously pointed out, increases with ambient temperature. Therefore, the speed of the engine at which valve 191 begins to open is higher the higher the ambient temperature. This accords with the desired operating characteristic, in which it is desired that enrichment begin only at a speed above the surge bite of the particular engine. The speed at which the engine becomes less susceptible to surge is higher with higher ambient temperatures. The maximum opening of valve 196 and therefore the maximum amount of enrichment fuel which may pass is limited by an adjustable eccentric stop 198 which engages the lever 186.

FIGURE 7 is illustrative of the operation. This is a typical chart of fuel flow against revolutions per minute of the gas generator, not representative of any particular engine. Assume that the line W represents the fuel that would be admitted to the engine by the fuel metering mechanism limited by compressor discharge pressure at one ambient temperature and that line W' represents fuel flow at a higher ambient temperature. Curve S represents the surge limit of fuel at a low ambient temperature and curve S' represents the limit under a higher ambient temperature. The enrichment valve opens along the line E at the low temperature and the line E' at the higher temperature. The initiation of enrichment is shifted to higher r.p.m.'s as the surge limit shifts with temperature. The fuel flow under steady-state running is normally limited by the speed responsive valves 98 and 70. Enrichment valve 196 does not change the steady-state fuel flow since, if the enrichment fuel added tends to cause the engine to go overspeed, the governor operated valve 98 or 70 will close to reduce the fuel metered through the main circuit and hold the engine on speed.

*Fuel Enrichment (FIGURE 6)*

Figure 6:
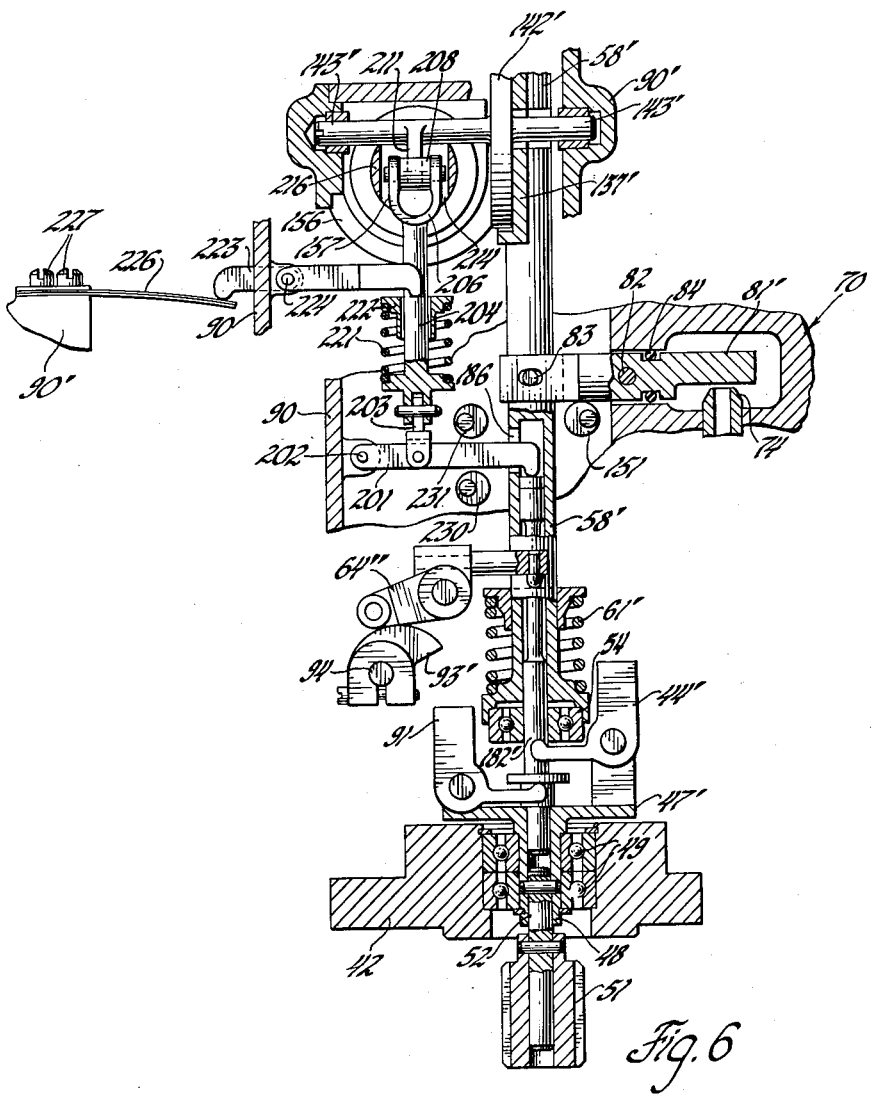
FIGURE 6 is a partial schematic view of a second form of gas generator fuel control, showing modifications to the structure illustrated by FIGURES 2, 4, and 5.

The schematic drawing of FIGURE 6 illustrates a second embodiment of the invention, which has many parts in common with that heretofore described, and which are identified correspondingly to the other species. FIGURE 6 shows two principal differences from the first species, either of which could be employed independently of the other. One difference is the employment of a separate temperature responsive device to control enrichment rather than a piston or diaphragm responsive to metering head. The device of FIGURE 6 differs from that of FIGURES 2 and 5 also in that the enrichment mechanism varies the limits of the main metering valve instead of operating an enrichment valve in parallel with it.

The nature of the mechanism will be clear from FIGURE 6 which shows a speed responsive main metering valve operating mechanism 42, 51, 48, 47', 44', 58', 81', 74, which is essentially identical to that previously described. It shows also an enrichment speed sensing flyweight mechanism including flyweights 91 and a stem 182' which, except for design details, is indistinguishable from stem 182 and is mounted in the same manner in the shaft 48, bearing 54, and stem 58'. The upper end of stem 182' engages a lever 201 which passes through a slot 186 in the stem 58'. This lever is pivoted on a pin 202 extending from a portion of the fixed structure or case 90. An intermediate point of lever 201 is coupled by a universal joint 203 to a push rod 204, the upper end of which has a clevis 206 which supports a cylindrical follower 208. Follower 208 corresponds to follower 171 of the other species, and is moved by the CDP bellows 156 to rotate shaft 143' of limit cam 142'. The follower 208 is slidably mounted on a radial arm 211 extending from the camshaft 143'. Vertical movement of the follower 208 in response to movement of lever 201 by the speed responsive mechanism shifts the follower 208 vertically, thereby varying the crank arm or ratio of the transmission from the CDP bellows to the limit cam 142'. The follower 208 is mounted in a slot 214 between portions 216 of the head 157 which connects the CDP bellows 156 with the evacuated bellows 153, similarly to FIGURE 4.

The flyweights 91 are loaded by a compression spring 221 mounted between a head on the push rod 204 and a slidable abutment 222. Abutment 222 is biased downwardly by the clevised end of a lever 223 pivoted at 224 on a portion of the case 90. A suitable bimetal device illustrated as a bimetal strip 226 fixed by screws 227 to an immovable portion 90' of the case engages an end of the lever 223. As temperature increases, the upward force of bimetal spring or leaf 226 increases, and it thus increases the loading on spring 221, and, therefore, increases the engine speed at which the enrichment begins.

As mentioned previously, enrichment in this form of the device is performed by varying the limits of movement of the governor-operated valve 70. As the speed increases, the effective crank arm by which the CDP bellows acts on cam 142' is decreased. The movement of cam 142' is, therefore, such as would be appropriate to a higher CDP as engine speed increases. The result is to raise the limit of opening of valve 74. The point at which this enrichment begins is shifted to higher speeds as the temperature increases by the bimetal device 226. Adjustable eccentric stops 230 and 231 may be provided to limit the movement of lever 201 and therefore the range of travel of follower 208, and this accordingly determines the degree of enrichment.

The mode of operation of the control shown in FIGURE 6 may be reviewed with reference to the chart of FIGURE 8, which, like FIGURE 7, is an idealized diagram of fuel flow plotted against revolution per minute. It will be understood that this diagram is not intended to represent the characteristics of any specific engine, but merely to illustrate the operation of the control. The steady-state fuel metering ordinarily is determined by the governor-operated valve 70, but during acceleration the fuel is limited by the response to compressor discharge pressure. This determines the maximum opening of the metering valve 70. The fuel flow also is affected by temperature, since this determines the metering head. The limits in response to CDP are represented in FIGURE 8 by the lines W, W', and W". These represent different curves such as might result from different compressor inlet temperatures giving rise to different compressor discharge pressures. The curves S and S' represent the varying limits of the surge region, which it is desired to avoid. Assuming that the temperature is such as corresponds to curve S, the fuel limiting may follow the line W' up to a value of engine r.p.m. at which enrichment is desirable, upon which the speed responsive mechanism shifts the follower 208 to increase the effective ratio of transmission from the CDP bellows to the limit cam and thereby transfer the metering schedule through the line E to the line W corresponding to a higher CDP and calling for higher fuel flow. It will be noted that the basic schedule of line W intersects this surge region, and therefore would not be satisfactory for acceleration below the transition point indicated by the line E.

On a hotter day the limit schedule of line W' would fall into the surge region represented by S'. In this case, the compressor discharge pressure being somewhat less on a hot day, the fuel follows first the curve W" until the effects of speed and temperature cause their shift over the line E' to the line W'. Since the ambient temperature is higher, the shift occurs at a higher speed because of the greater loading of the speed responsive mechanism by the bimetallic lever 226. Thus, the surge region, which has shifted to a higher speed, is skirted by raising the lower boundary of the enrichment speed range.

Certain general considerations regarding the controls should be pointed out. They have been described herein as including a separate governor for a free power turbine, since this is a more complicated case. Where the engine controlled is of a single shaft type (as for example, if turbines 13 and 16 shown in FIGURE 1 are mounted on the same shaft) the power turbine governor is omitted. This involves no structural or other difficulty, since it merely requires that port 103 of FIGURE 2 be connected directly to port 104 either externally or within the structure of the control assembly.

In most applications for controls of this sort, ambient temperature respresents a very satisfactory approximation to engine inlet temperature, and some simplification of the controls may be had by mounting the ambient temperature sense on the control assembly. However, it is to be understood that the term "ambient temperature" or "air temperature" as used herein and in the claims is intended to mean temperature of air before or after entering the inlet of the engine. If the fuel control is mounted so as to be heated significantly by the engine, the ambient temperature sense should be protected against such heating. Particularly with the form of device of FIGURE 2, the ambient temperature responsive capsule 139 may be located at any desired point and be connected to the spring abutment 136 by a Teleflex cable or the like. Either temperature responsive device may be in the engine air inlet if desired.

It may be further pointed out that while it is desirable to use the metering pressure to provide the temperature sense to the enrichment mechanism, when this pressure is modulated in response to temperature, this is not necessary, and other ambient temperature responsive means such as the bimetallic device of FIGURE 6 may be used. In this connection, for example, such a bimetallic device could be used to load the valve member 186 of FIGURE 5 instead of the metering head responsive diaphragm. Contrariwise, a metering head responsive device could obviously be connected to bias the lever 223 of the form of FIGURE 6.

The detailed description of the preferred embodiments of the invention for the purpose of explaining the principles thereof is not to be considered as limiting or restricting the invention, since many modifications may be made within the scope of the invention by the exercise of skill in the art.

I claim:

1. A fuel control for a gas turbine engine comprising, in combination, main fuel metering means, means responsive to turbine speed controlling the main metering means, means responsive to the pressure drop across the metering means to maintain said pressure drop constant, means responsive substantially solely to air temperature biasing said pressure drop responsive means, limit means coupled to the metering means establishing maximum and minimum fuel metering schedules varying with a condition of compressor operation, means responsive to the said condition of compressor operation operating the limit means, and means responsive to turbine speed and to the pressure drop across said metering means and thus to air temperature effective to shift the limit means and thereby enrich the fuel schedule within a higher speed portion of the engine speed operating range.

2. A fuel control for a gas turbine engine comprising, in combination, main fuel metering means, means responsive to turbine speed controlling the main metering means, limit means coupled to the metering means establishing maximum and minimum fuel metering schedules varying with a condition of compressor operation, means responsive to the said condition of compressor operation operating the limit means, and means responsive to air temperature and to turbine speed effective to shift the limit means and thereby enrich the fuel schedule within a higher speed portion of the engine speed operating range, the last-mentioned means comprising variable ratio means coupling the compressor operation responsive means to the limit means, the variable ratio means comprising an input controlled by the compressor operation responsive means and an input controlled by means responsive substantially solely to air temperature and means responsive to turbine speed, multiplying means providing the product of the inputs, and an output driven by the multiplying means coupled to the limit shifting means.

3. A fuel control for a gas turbine engine comprising, in combination, a main fuel metering valve, metering head regulating means controlling the pressure drop across the said valve, means responsive substantially solely to air temperature coupled to the head regulating means so as to increase metering head substantially directly with air temperature, means responsive to turbine speed operating the main metering valve, a movable limit means coupled to the metering valve establishing maximum and minimum fuel metering schedules, means responsive to compressor discharge pressure operating the limit means, and means responsive to turbine speed and to the pressure drop across the metering valve and thus to air temperature coupled to the limit means to adjust the limit means as a function of said speed and temperature and effective to enrich the fuel schedule within a higher speed portion of the engine speed operating range.

4. A fuel control for a gas turbine engine comprising, in combination, a main fuel metering valve, metering head regulating means controlling the pressure drop across the said valve, means responsive to turbine speed operating the main metering valve, movable limit means coupled to the metering valve establishing maximum and minimum fuel metering schedules varying with compressor discharge pressure, means responsive to compressor discharge pressure controlling the limit means, and means responsive to air temperature and turbine speed effective to enrich the fuel schedule within a higher speed portion of the engine speed operating range, the last-mentioned means comprising variable ratio means coupling the compressor discharge pressure responsive means to the limit means, the variable ratio means comprising an input controlled by compressor discharge pressure and an input controlled by means responsive substantially solely by air temperature and means responsive to turbine speed, multiplying means providing the product of the inputs, and an output driven by the multiplying means coupled to the enriching means.

5. A fuel control as recited in claim 4 in which the enriching means is connected to the limit means to shift the limit means.

References Cited in the file of this patent

UNITED STATES PATENTS

| 2,757,511 | Jagger | Aug. 7, 1956 |
| 2,939,280 | Farkas | June 7, 1960 |
| 2,947,142 | Nugent | Aug. 2, 1960 |
| 2,971,574 | Kuzmitz | Feb. 14, 1961 |

FOREIGN PATENTS

| 664,807 | Great Britain | Jan. 9, 1952 |